(12) United States Patent
Winnacker et al.

(10) Patent No.: US 8,109,721 B2
(45) Date of Patent: Feb. 7, 2012

(54) BEARING ARRANGEMENT FOR A TURBINE ROTOR OF A DRILL STRING TURBINE

(75) Inventors: Helmut Winnacker, Burgdorf (DE); Uwe Draeger, Barsinghausen (DE)

(73) Assignee: Weatherford Energy Services GmbH, Edemissen (DE)

( * ) Notice: Subject to any disclaimer, the term of this patent is extended or adjusted under 35 U.S.C. 154(b) by 1032 days.

(21) Appl. No.: 12/069,480

(22) Filed: Feb. 11, 2008

(65) Prior Publication Data

US 2008/0240909 A1    Oct. 2, 2008

(30) Foreign Application Priority Data

Mar. 27, 2007  (DE) .......................... 10 2007 015 266

(51) Int. Cl.
*F01D 25/16*   (2006.01)

(52) U.S. Cl. ..... 415/230; 415/903; 415/111; 415/168.3; 415/171.1; 415/901

(58) Field of Classification Search ................ 415/110, 415/111, 171.1, 173.1, 168.2, 168.3, 229, 415/230, 901, 903

See application file for complete search history.

(56) References Cited

U.S. PATENT DOCUMENTS

| | | | | |
|---|---|---|---|---|
| 1,504,658 | A * | 8/1924 | Ulmer | 415/109 |
| 4,246,976 | A * | 1/1981 | McDonald, Jr. | 175/107 |
| 5,959,380 | A | 9/1999 | Gillett et al. | |
| 6,607,030 | B2 * | 8/2003 | Bauer et al. | 166/65.1 |
| 7,133,325 | B2 * | 11/2006 | Kotsonis et al. | 367/83 |

FOREIGN PATENT DOCUMENTS

| | | |
|---|---|---|
| DE | 197 06 371 | 8/1998 |
| EP | 0 762 606 | 3/1997 |
| WO | WO 00/36268 | 6/2000 |

OTHER PUBLICATIONS

British Search Report.

* cited by examiner

*Primary Examiner* — Justine Yu
*Assistant Examiner* — Liam McDowell
(74) *Attorney, Agent, or Firm* — Collard & Roe, P.C.

(57) ABSTRACT

A bearing arrangement for a turbine rotor of a turbine is adapted to be mounted in a drill string and to be driven by the flow of drilling fluid. The bearing arrangement includes a turbine chamber surrounding the turbine rotor and having an inflow and an outflow, a stator on which the turbine rotor is rotatably mounted, and a cavity formed between the turbine rotor and the stator and accommodating at least one radial plain bearing and being separated from the turbine chamber by an axial plain bearing constructed as a bearing ring seal and by a conveyor screw which is disposed on the turbine rotor and operates to convey from the cavity to the turbine chamber.

10 Claims, 1 Drawing Sheet

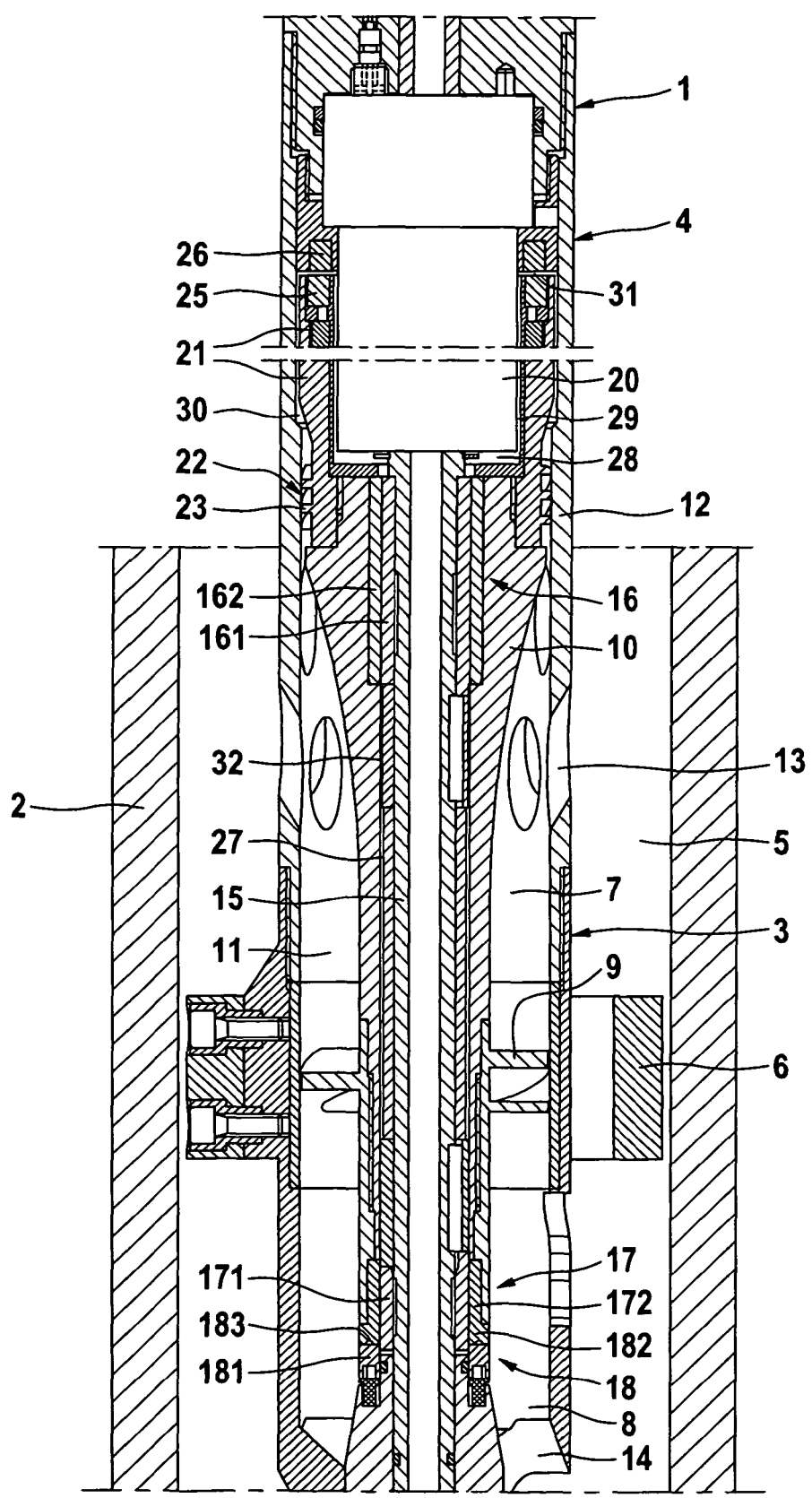

BEARING ARRANGEMENT FOR A TURBINE ROTOR OF A DRILL STRING TURBINE

BACKGROUND OF THE INVENTION

1. Field of the Invention

This invention relates to a bearing arrangement for a turbine rotor of a turbine adapted to be mounted in a drill string and to be driven by the flow of drilling fluid, comprising a turbine chamber surrounding the turbine rotor and having an inflow side and an outflow side, a stator with an axle on which the turbine rotor is rotatably mounted, a cavity formed between the turbine rotor and the stator and accommodating at least one radial plain bearing and being separated from the turbine chamber by two relatively spaced constrictions formed between the stator and the turbine rotor, and an axial plain bearing constructed as a bearing ring seal which provides a first constriction.

2. The Prior Art

A bearing arrangement of the aforementioned type is known from DE 197 06 371 A1. In the known bearing arrangement, the second constriction separating the cavity from the turbine chamber is disposed on the inflow side of the turbine chamber and is formed by an axial ring gap which extends in opposition to the inflow direction and through which drilling fluid can reach the cavity and the bearing gap of the radial plain bearing associated with the cavity, in order to provide for the necessary lubrication. The ring gap is connected to the bearing gap through two radial gap sections and an axial gap section connecting the radial gap sections. The axial gap sections are maintained in open position by two opposite permanent magnets which also ensure continuous contact between the bearing surfaces of the axial plain bearing. The known configuration is intended to prevent the entrainment of abrasive solid particles in the bearing gap of the plain bearing. However, practice has shown that this object is not achieved to a sufficient degree with the known configuration.

SUMMARY OF THE INVENTION

It is an object of the present invention to ensure in a bearing arrangement of the type initially referred to an adequate lubrication by the flow of drilling fluid and to be effective in protecting the bearing arrangement from the ingress of contaminants and other solid particles.

This object is accomplished by a bearing arrangement according to the invention. Advantageous embodiments of the invention are indicated below.

According to the present invention, the turbine rotor mounts a conveyor screw which provides the second constriction between the turbine rotor and the stator and operates to convey from the cavity to the turbine chamber. The conveyor screw is designed to produce on its outflow side close to the turbine chamber a dynamic pressure which equals at least the pressure prevailing at this location in the turbine chamber, so that with the turbine running the drilling fluid in the turbine chamber cannot enter the cavity of the bearing arrangement through the conveyor screw. With the turbine rotor rotating, the conveyor screw produces in the cavity a pressure below atmospheric which, on account of the sealing effect of the axial plain bearing, does not however cause drilling fluid to be drawn from the turbine chamber. It is only to an extent determined by the capillary action of the friction partners of the axial plain bearing that a minimum amount of the drilling fluid enters the cavity while the turbine is running. The ingress of solid particles is however limited to an ineffective particulate size by the friction partners of the axial plain bearing being pressed against each other. Also microscopically small ferrite particles which can pass the axial plain bearing due to its permeability necessary for lubrication remain transportable as magnetically not inhibiting mass of soapy consistency and are carried to the outside by the suction of the conveyor screw. Only with the turbine at standstill is the conveyor screw without effect. In this instance, drilling fluid does not however pass from the turbine chamber beyond the operating range of the conveyor screw so that any solid particles entered are fed back by the conveyor screw into the turbine chamber when the turbine is restarted.

According to another proposal of the invention, provision may be made for an array of axially acting permanent magnets arranged on the stator and/or on the turbine rotor and acting with their magnetic force on the axial plain bearing. It is thereby ensured that the sealing effect of the axial plain bearing is maintained even in cases when the axial plain bearing is not exposed to the pressure force acting on the turbine rotor when, for example, the turbine is at standstill. Preferably, the permanent magnets are arranged in the area of the cavity and at a distance from the conveyor screw. In this way, ferrite particles are prevented from reaching the permanent magnets where they could form interfering magnetic bridges.

Preferably, the second constriction formed by the conveyor screw is arranged on the inflow side of the turbine chamber, and the axial plain bearing forming the first constriction is arranged on the outflow side of the turbine chamber, each at a relative distance from the blades of the turbine rotor.

According to a further proposal of the invention, provision is made for the turbine rotor to be fixedly connected to the rotor of a generator, and for the ring gap between the rotor and the stator of the generator to form a portion of the cavity. This configuration has the advantage that the rotor of the generator requires no separate bearing arrangement and that it obviates the need for a separate pressure compensation or a shaft seal for the ring gap of the generator.

BRIEF DESCRIPTION OF THE DRAWING

The sole FIGURE shows an embodiment of the invention in longitudinal section.

DETAILED DESCRIPTION OF THE PREFERRED EMBODIMENT

The present invention will be described in more detail in the following with reference to an embodiment illustrated in the accompanying drawing.

The drawing shows in longitudinal section portions of a sensor 1 and of a drill string 2 receiving the sensor 1. Sensors of the this type find application in deep drilling technology and serve to sense measurement data which during drilling provide information about the orientation of the drill bit and the drilling conditions in the borehole. By means of suitable telemetry devices the data obtained is transferred to above ground for evaluation. To operate the measuring instruments and the telemetry devices, electrical energy is needed which is generated in the illustrated portions of the sensor 1 by means of a turbine 3 and a generator 4 driven by it.

The turbine 3 is driven by the drilling fluid which is fed through an annular chamber 5 defined between the inner wall of the drill string 2 and the sensor 1 to the drill bit at the bottom end of the drill string 2. A guide ring 6 fastened to and surrounding the sensor 1 constricts the annular chamber 5 between the inflow 7 and the outflow 8 of the turbine 3, thereby directing part of the drilling fluid current to the blades 9 of a turbine rotor 10.

The turbine rotor 10 is arranged in a turbine chamber 11 formed in a portion of a cylindrical casing 12 of the sensor 1. The inflow and the outflow of the turbine chamber 11 are connected to the annular chamber 5 through apertures 13 and 14, respectively, in the casing 12. The casing 12 is closed in the area of the blades 9.

Extending longitudinally through the casing 12 is a central axle 15 having its ends connected with the casing 12 in a firm and pressure-tight relationship and combining with the casing to form part of the stator of the turbine 3 and of the generator 4. The axle 15 has a longitudinal through bore, thereby enabling an electric bus connection from one end of the casing 12 to the other. This enables the casing to be arranged at any location of a sensor composed of several portions.

A portion of the axle 15 on the side close to the turbine 3 is surrounded by the tubular turbine rotor 10 which is rotatably mounted on the axle 15 by means of two radial plain bearings 16, 17. The radial plain bearings 16, 17 are arranged on opposite ends of the turbine rotor 10. They have each an inner bearing bushing 161, 171 and an outer bearing bushing 162, 172. The bearing bushings are made of wear-resistant bearing material such as cemented carbide, ceramics or the like. The inner bearing bushings 161, 171 are connected with the axle 15 in a non-rotating relationship, and the outer bearing bushings 162, 172 are connected with the turbine rotor 10 in a non-rotating relationship.

Provided on the outflow side of the turbine rotor 10 is an axial plain bearing 18 having a stationary bearing ring 181 and a rotary bearing ring 182. Through an intermediate member the bearing ring 181 is supported on a wall portion of the casing 12 and has a bearing surface constructed as a plane annular surface. The bearing ring 182 is formed by an end portion of the bearing bushing 172. Its bearing surface is divided by a central annular groove 183 into a radially inner and a radially outer annular surface. The bearing surfaces of both bearing rings 181, 182 slide upon each other and act in the manner of a bearing ring seal which is supposed to allow the passage of only minimum amounts of fluid. Like the bearing bushings of the radial plain bearings, also the bearing rings 181, 182 are made of a wear-resistant bearing material such as cemented carbide, ceramics or the like.

On a portion contiguous with the turbine 3, the axle 15 carries the stator of the generator 4 comprised of an iron core and a coil arrangement, which stator is surrounded by a thin-walled sleeve 20 of nonmagnetic material. The sleeve 20 is surrounded by a sleeve-shaped generator rotor 21 containing permanent magnets for generating the generator field. The generator rotor 21 has its one end fixedly screw-connected to the turbine rotor 10 and is carried and driven to rotate by the turbine rotor 10. The end of the generator rotor 21 screw-connected to the turbine rotor 10 has on its outside a conveyor screw 22 formed by a radially outwardly directed rib 23 extending along a helical line. The generator rotor 21 inclusive of the conveyor screw 22 is surrounded by a closed ring portion of the casing 12 with allowance for a small amount of play.

Fastened to the end of the generator rotor 21 remote from the turbine rotor 10 is an annular permanent magnet 25 opposite which lies a second annular permanent magnet 26 which takes support upon the casing 12. The permanent magnets 25, 26 are arranged to repel each other, thereby producing an axial force maintaining relative contact between the bearing surfaces of the axial plain bearing 18 also when the turbine 3 is at standstill.

The turbine rotor 10 and the generator rotor 21 are separated by intermediate spaces 27, 28, 29, and the bearing gaps of the radial plain bearings are separated from the axle 15 and the sleeve 20. Furthermore, an intermediate space 30 exists between the circumferential surface of the generator rotor 21 and the casing 12, which space is in communication with the intermediate space 29 through a radial gap 31 between the permanent magnets 25, 26. Said intermediate spaces 27 to 30 and the gap 31 combine to form a through-going cavity 32 which is accessible from the outside at the site of two constrictions, namely the axial plain bearing 18 and the conveyor screw 22. On the axial plain bearing 18 access to the cavity 32 is prevented nearly completely by the sealing effect of the axial plain bearing 18 since its bearing surfaces are maintained in permanent relative contact. The permeability of the axial plain bearing 18 is just sufficient to lubricate the bearing surfaces in addition to forming an effective barrier against the ingress of solid particles.

When the turbine rotor 10 is at standstill, drilling fluid could enter on the conveyor screw 22 from the turbine chamber 11 into the cavity 32. However, with the turbine rotor 10 at standstill, no drilling fluid is conveyed, so that the risk of solid particles ascending and being entrained in the cavity 32 is extremely low, all the more so since the transport of solid particles is prevented due to the force of gravity at standstill by the thixotropy of the drilling fluid current. At standstill there occurs thus no entrainment of solid particles that are not conveyed back into the turbine chamber by the rotating conveyor screw. When the turbine rotor 10 is driven by the drilling fluid current, the conveyor screw 22 produces a dynamic pressure which is directed against the turbine chamber 11 and prevents the ingress of drilling fluid and hence of solid particles into the cavity 32. In this way a bearing arrangement for the turbine rotor 10 and the generator rotor 21 is provided which is lubricated by the drilling fluid, requires no elaborate devices for pressure compensation and shaft seals, and is reliably protected against the ingress of abrasive and jamming solid particles. The bearing arrangement of the invention therefore ensures reliable operation and long service life even in an extreme temperature and pressure environment and high demands on wear in the drill string of a deep-drilling device.

What is claimed is:

1. A bearing arrangement for a turbine rotor of a turbine adapted to be mounted in a drill string and to be driven by the flow of drilling fluid, comprising:

a turbine chamber surrounding the turbine rotor and having an inflow side and an outflow side, a stator with an axle on which the turbine rotor is rotatably mounted, a cavity formed between the turbine rotor and the stator and accommodating at least one radial plain bearing and being separated from the turbine chamber by a first constriction and a second constriction, the first and second constrictions being relatively spaced and formed between the stator and the turbine rotor, an axial plain bearing constructed as a bearing ring seal which provides the first constriction, and a conveyor screw mounted on the turbine rotor and providing the second constriction, said conveyor screw operating to convey from the cavity to the turbine chamber, wherein the axial plain bearing has a first bearing ring mounted on the turbine rotor and a second bearing ring mounted on the stator, wherein the first bearing ring has a first annular bearing surface and the second bearing ring has a second annular bearing surface, the first and second bearing rings resting against each other with the first annular bearing surface and the second annular bearing surface, and wherein at least one of the first annular bearing surface and the second annular bearing surface has at least one concentric annular surface dividing the at least one of the first annular bearing surface and the second annular bearing surface into a radially outer annular bearing surface portion and a radially inner annular bearing surface portion.

2. The bearing arrangement according to claim 1, wherein the second constriction formed by the conveyor screw is disposed on the inflow side of the turbine chamber at a distance from the blades of the turbine rotor.

3. The bearing arrangement according to claim 1, wherein the axial plain bearing forming the first constriction is disposed on the outflow side of the turbine chamber at a distance from the blades of the turbine rotor.

4. The bearing arrangement according to claim 1, wherein axially acting permanent magnets are arranged on the stator and/or on the turbine rotor and act with their magnetic force on the axial plain bearing.

5. The bearing arrangement according to claim 4, wherein the permanent magnets are arranged in the area of the cavity and at a distance from the conveyor screw.

6. The bearing arrangement according to claim 1, wherein the at least one radial plain bearing comprises a first radial plain bearing and a second radial plain bearing relatively spaced from the first radial plain bearing, the first and second radial plain bearings being for rotatably mounting the turbine rotor.

7. The bearing arrangement according to claim 1, wherein the turbine rotor is connected with the rotor of a generator and wherein the cavity encompasses the ring gap between the rotor and a stator of the generator.

8. The bearing arrangement according to claim 1, wherein the axle has a longitudinal through bore and the ends of the axle are secured to the stator in a pressure-tight relationship.

9. The bearing arrangement according to claim 7, wherein the generator is arranged on the axle adjacent to the turbine rotor, and the stator of the generator is mounted on the axle.

10. A bearing arrangement for a turbine rotor of a turbine adapted to be mounted in a drill string and to be driven by the flow of drilling fluid, comprising:

a turbine chamber surrounding the turbine rotor and having an inflow side and an outflow side, a stator with an axle on which the turbine rotor is rotatably mounted, a cavity formed between the turbine rotor and the stator and accommodating at least one radial plain bearing and being separated from the turbine chamber by a first constriction and a second constriction, the first and second constrictions being relatively spaced and formed between the stator and the turbine rotor, an axial plain bearing constructed as a bearing ring seal which provides the first constriction, and a conveyor screw mounted on the turbine rotor and providing the second constriction, said conveyor screw operating to convey from the cavity to the turbine chamber, wherein the axial plain bearing has a first bearing ring mounted on the turbine rotor and a second bearing ring mounted on the stator, wherein the first bearing ring has a first annular bearing surface and the second bearing ring has a second annular bearing surface, the first and second bearing rings resting against each other with the first annular bearing surface and the second annular bearing surface, and wherein the first bearing ring is formed by an end portion of a bearing bushing, the bearing bushing being part of the at least one radial plain bearing of the turbine rotor.

* * * * *